United States Patent [19]

Sashida

[11] E Patent Number: Re. 33,390

[45] Reissued Date of Patent: Oct. 16, 1990

[54] MOTOR DEVICE UTILIZING ULTRASONIC OSCILLATION

[76] Inventor: Toshiiku Sashida, 1-8, Kasuya 2-chome, Setagaya-ku, Tokyo 157, Japan

[21] Appl. No.: 135,187

[22] Filed: Dec. 18, 1987

Related U.S. Patent Documents

Reissue of:

[64] Patent No.: 4,562,374
Issued: Dec. 31, 1985
Appl. No.: 610,933
Filed: May 16, 1984

U.S. Applications:

[63] Continuation of Ser. No. 469,245, Feb. 24, 1983, abandoned.

[30] Foreign Application Priority Data

| | | | |
|---|---|---|---|
| Feb. 25, 1982 | [JP] | Japan | 57-29400 |
| Nov. 22, 1982 | [JP] | Japan | 57-205220 |
| Dec. 26, 1982 | [JP] | Japan | 57-228569 |

[51] Int. Cl.[5] ..... H01L 41/08
[52] U.S. Cl. ..... 310/328; 310/323
[58] Field of Search ..... 310/26, 326, 327, 328, 310/329, 330, 323

[56] References Cited

U.S. PATENT DOCUMENTS

| | | | |
|---|---|---|---|
| 4,400,641 | 8/1983 | Vishnevsky et al. | 310/328 |
| 4,484,099 | 11/1984 | Kawai et al. | 310/328 |
| 4,495,432 | 1/1985 | Katsuma et al. | 310/328 |
| 4,504,790 | 3/1985 | Yamamoto et al. | 310/328 |
| 4,513,219 | 4/1985 | Katsuma et al. | 310/328 |

FOREIGN PATENT DOCUMENTS

| | | | |
|---|---|---|---|
| 399036 | 11/1973 | U.S.S.R. | 310/328 |
| 573828 | 9/1977 | U.S.S.R. | 310/328 |
| 595813 | 3/1978 | U.S.S.R. | 310/328 |
| 651434 | 8/1979 | U.S.S.R. | 310/328 |
| 1323196 | 7/1973 | United Kingdom . | |
| 2044013 | 10/1980 | United Kingdom . | |
| 2044014 | 10/1980 | United Kingdom . | |
| 2044015 | 10/1980 | United Kingdom . | |

*Primary Examiner*—Mark O. Budd
*Assistant Examiner*—D. L. Rebsch
*Attorney, Agent, or Firm*—Armstrong, Nikaido, Marmelstein, Kubovcik & Murray

[57] ABSTRACT

A motor device utilizing ultrasonic oscillation, which comprises an ultrasonic oscillator including an elastic body and one or more piezoelectric, electrostriction or magnetostriction elements assembled in or on the elastic body, and a movable body movable in a fixed direction. A portion of the ultrasonic oscillator and a portion of the movable body are held pressed against each other. A progressive wave, which is generated by a longitudinal wave and a transverse wave, is converted to a unidirectional motion of the movable body.

29 Claims, 5 Drawing Sheets

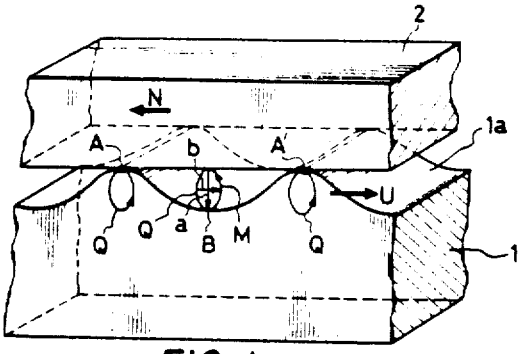
FIG. 1
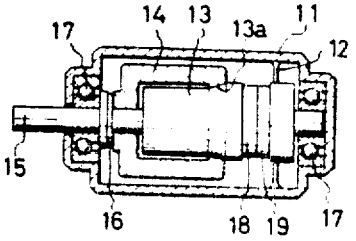
FIG. 2
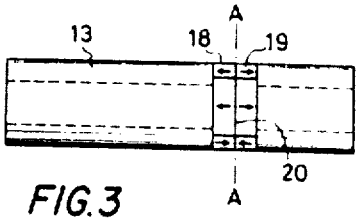
FIG. 3
FIG. 4
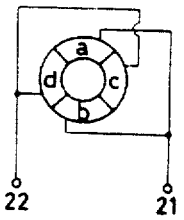

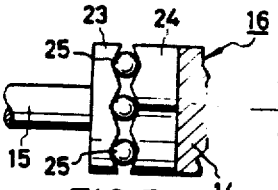
FIG. 5
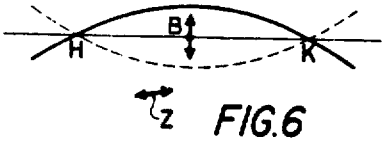
FIG. 6
FIG. 7(A)
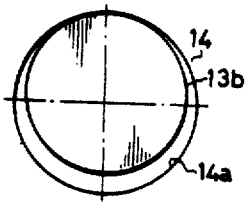
FIG. 7(B)
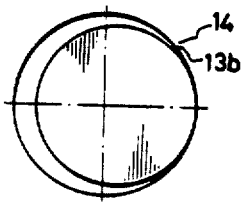
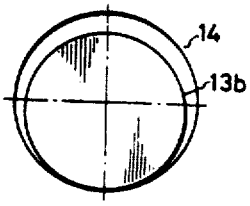
FIG. 7(C)
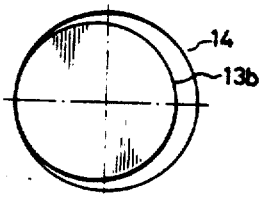
FIG. 7(D)
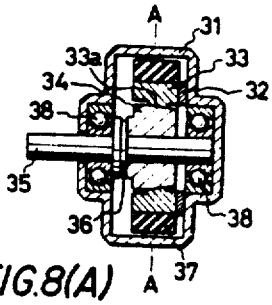
FIG. 8(A)
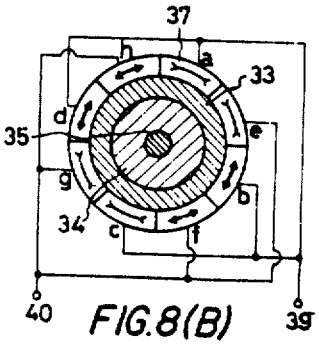
FIG. 8(B)

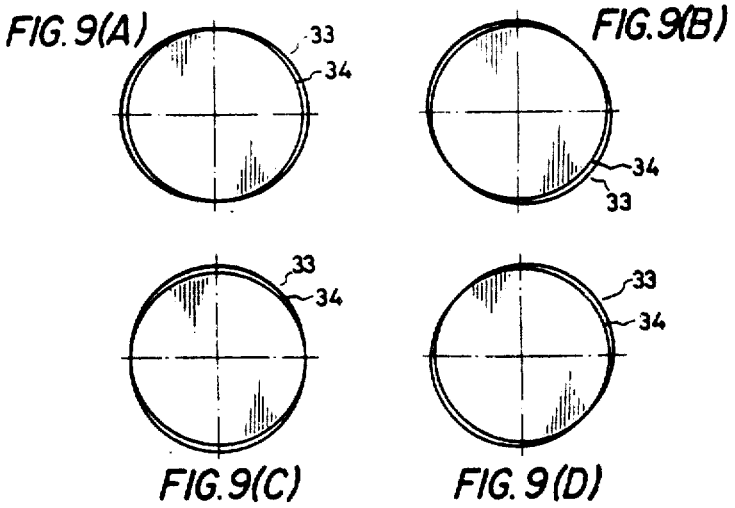
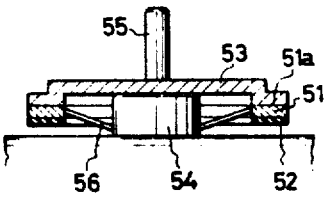
FIG. 10(A)
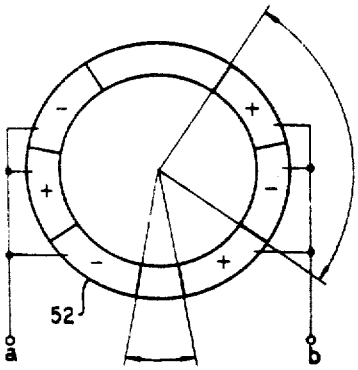
FIG. 10(B)
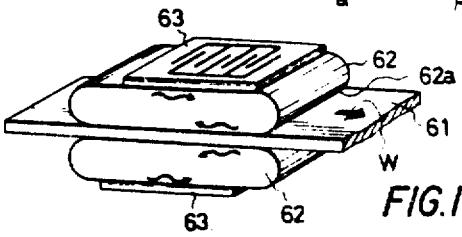
FIG. 11

FIG. 12
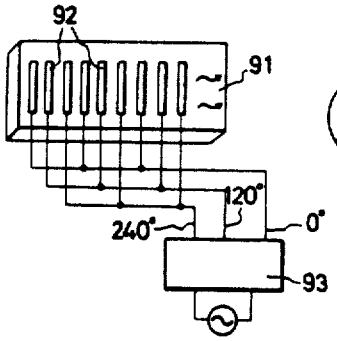
FIG. 13
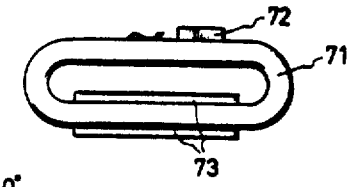
FIG. 14(A)
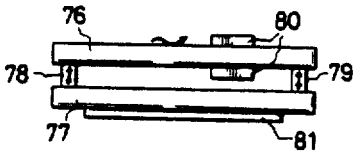
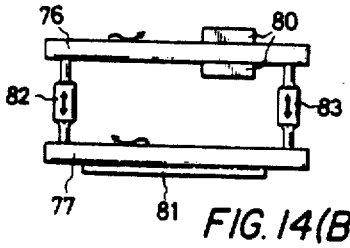
FIG. 14(B)
FIG. 15
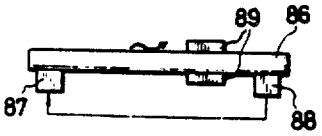

MOTOR DEVICE UTILIZING ULTRASONIC OSCILLATION

Matter enclosed in heavy brackets [ ] appears in the original patent but forms no part of this reissue specification; matter printed in italics indicates the additions made by reissue.

This application is a continuation of application Ser. No. 469,245 filed Feb. 24, 1983 now abandoned.

FIELDS OF THE INVENTION

This invention relates to a motor device in which a progressive wave produced on the surface of an ultrasonic oscillator is converted into a uni-directional motion of a movable body held pressed against the oscillator.

DESCRIPTION OF THE PRIOR ART

Prior art motor devices of various types used for a variety of purposes mostly utilize electromagnetic forces as their drive source. The size, weight and torque of these devices, however, are limited by the material used. More particularly, the factors noted above are determined by the magnetic properties of the material used, and a device which is designed beyond the properties of the material cannot provide driving torque.

SUMMARY OF THE INVENTION

An object of the invention is to provide a small-size and light-weight motor device, in which high oscillation energy of an ultrasonic wave is converted to rotational or translational motion.

A more specific object of the invention is to provide a motor device which utilizes a progressive wave produced on the surface of an ultrasonic oscillator, including an elastic body and one or more piezoelectric, electrostriction or magnetrostriction elements assembled therein or thereon.

BRIEF DESCRIPTION OF THE DRAWINGS

FIG. 1 is a fragmentary perspective view for explaining the operational principles underlying the invention;

FIG. 2 is a sectional view showing an embodiment of the invention;

FIG. 3 is a side view showing an oscillator;

FIG. 4 is a schematic sectional view taken along line A—A in FIG. 3;

FIG. 5 is a side view showing an example of a pressure adjustment mechanism;

FIG. 6 is a view for explaining elastic oscillation of the oscillator;

FIG. 7 illustrates the state of contact between oscillator and rotor;

FIG. 8A is a sectional view showing a different embodiment of the invention;

FIG. 8B is a schematic sectional view taken along line A—A in FIG. 8A;

FIG. 9 illustrates the state of contact between oscillator and rotor;

FIG. 10A is a sectional view showing a further embodiment of the invention;

FIG. 10B is a schematic view showing the arrangement of piezoelectric member electrodes;

FIG. 11 is a perspective view showing a further embodiment of the invention;

FIG. 12 is a view showing a method of generating a unidirectional surface wave used for the embodiment of FIG. 12;

FIG. 13 is a view showing a linear motor using an endless elastic member;

FIG. 14A is a view showing a linear motor using a loop structure including couplers;

FIG. 14B is a view showing a linear motor using a loop structure including resonators;

FIG. 15 is a view showing a linear motor using a single linear elastic member and two oscillators;

DETAILED DESCRIPTION OF THE INVENTION

Figure 16:
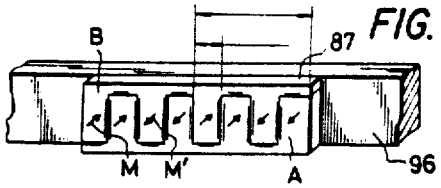
FIG. 16 is a view showing an electrode arrangement for producing a progressive wave on a rod-like elastic member with a piezoelectric member.

The operational principles and some preferred embodiments of the motor device according to the invention will be described with reference to the drawings. FIG. 1 is a fragmentary perspective view illustrating the operational principles underlying the invention. There is shown an elastic body, for example, a metal, along the surface 1a of which is propagated a progressive wave, shown in an exaggerated form, which is constituted by a longitudinal wave and a transverse wave. Primarily, the progressive wave is a surface wave called Rayleigh wave. The existence of a wave propagated along the surface of an elastic body is made clear. Elastic waves propagated through solids include longitudinal waves and transverse waves. Longitudinal and transverse waves can exist in a solid independently, but they are complicatedly combined in a complex manner at the surface according to boundary conditions.

A Rayleigh wave can be produced by placing an oscillator, which can undergo longitudinal or transverse oscillation, on a medium plate and tapping the surface of the plate.

A surface wave can be observed at a position considerably spaced apart from the source of oscillation when the plate surface is tapped in whatever manner. Alternatively, the progressive wave is produced due to elastic oscillation of a bar-like (or plate-like) elastic body. In this case, the wave is propagated along the surface of the body with the formation of elliptical particle trajectories having longitudinal and transverse components 90 degrees out of phase with each other. In another case, the progressive wave is a longitudinal wave propagated along the surface of a bar-like (or plate-like) elastic body. In this case, a transverse wave based on the Poisson ratio appears on the surface of the elastic body. Again in this case particle trajectories having longitudinal and transverse components 90 degrees out of phase with each other are formed.

In FIG. 1, no oscillation source is shown, but only the state of propagation of the Rayleigh wave is shown. Here, a mass point B, for instance, is executing motion along an elliptical trajectory Q, which has a transverse component amplitude a (in the vertical directions) and a longitudinal component amplitude b (in the horizontal directions), in the direction of arrow M. The progressive wave is being propagated at the speed U of sound. In the state of FIG. 1, all points on the surface 1a of the elastic body are executing an identical motion. If a [free] *movable* body 2 is pressed against the surface 1a of the elastic body 1 in this state, the body 2 is in contact with the elastic body 1 only at the tops A, A' . . . of the progressive wave.

Since the tops A, A' . . . are moving in the direction of arrow M at an oscillation speed of $v=2\pi fb$ (where f is the oscillation frequency), the [free] *movable* body 2 is driven in the direction of arrow N by the frictional forces between it and the elastic body 1.

The motor device according to the invention is based on the driving of a movable body with a progressive wave as discussed above, and it will now be described in conjunction with some preferred embodiments. FIG. 2 is a sectional view showing one embodiment of the invention. A casing 11 accommodates a cylindrical *flexural* elastic oscillator 13, which has its node portion supported by a support 12. The oscillator 13 has a tapered outer periphery 13a formed substantially in a central portion along its length. The casing 11 also accommodates a rotor 14 which serves as a moving body. The rotor 14 has a tapered inner peripheral surface which is pressed against the tapered outer peripheral surface 13a of the oscillator 13.

The rotor 14 is supported for axial movement a shaft 15. Torque is transmitted from the rotor 14 to the shaft 15 via a pressure adjustment mechanism 16. The pressure adjustment mechanism 16 will be described later in detail with reference to FIG. 5. The shaft 15 is journalled in bearings 17.

The oscillator 13 includes electrostriction or piezoelectric elements 18 and 19 which are assembled as its intermediate section and serve as a source of a progressive wave. FIG. 3 shows a side view of the oscillator 13, and FIG. 4 shows a section taken along line A—A in FIG. 3. The electrostriction or piezoelectric elements 18 and 19 are capable of axial elongation and contraction as shown by arrows in FIG. 3. An electrode assembly 20 is sandwiched between the elements 18 and 19. The electrostriction or piezoelectric elements and the electrodes of the electrode assembly are arranged in a manner as shown in FIG. 4. A pair of diametrically opposed electrodes a and b are connected to a terminal 21. Another pair of electrodes c and d, which are also diametrically opposed, are connected to a terminal 22. Portions of the electrostriction or piezoelectric elements which are diametrically opposed to each other undergo elongation or contraction in opposite directions. More particularly, portions of the electrostriction or piezoelectric elements 18 and 19 which are in contact with the electrode a undergo expansion while their portions in contact with the electrode b undergo contraction. Likewise, their portions in contact with the electrode d undergo elongation while their portions in contact with the electrode c undergo contraction.

FIG. 5 is a sectional view showing a specific example of the pressure adjustment mechanism 16 mentioned above. The illustrated example is an automatic pressure adjustment mechanism. The mechanism includes a pair of special cams 23 and 24, which have opposed cam surfaces, each consisting of a plurality of V-shaped valley portions arranged side by side, and steel balls 25 each received in each pair of V-shaped portions of the opposed cam surfaces. When there is no load, each steel ball is located to correspond to the bottom of the associated pair of V-shaped valley portions. As torque is increased with application of load, the steel ball are displaced to force apart the opposed cam surfaces, thus generating an axial pressure. In this way, torque is transmitted from the rotor 14 to the shaft 15.

With the above construction, the oscillator 13 is caused to undergo elastic oscillation as shown in FIG. 6 by applying a high frequency voltage between it and the terminal 21, to which the electrodes a and b are connected as shown in FIG. 4. In the primary oscillation state as shown in FIG. 6, a central point B constitutes the loop while points H and K constitute the nodes of the oscillation. By applying a high frequency voltage which is 90 degrees out of phase with respect to the voltage applied to the electrodes a and b between the oscillator 13 and the other terminal 22, which is connected to the other electrodes c and d, an oscillation which is shifted in phase with respect to the afore-mentioned oscillation with the loop at the point B in the vertical direction (i.e., in the direction perpendicular to the plane of the Figure) is induced. The resultant wave of the longitudinal and transverse waves that are artificially produced in the above manner constitutes rotating circular oscillation.

FIGS. 7A to 7D show the state of contact between the outer periphery of the central portion 13b of the oscillator 13, which constitutes the loop of the oscillation, and the corresponding inner periphery 14a of the rotor 14 for individual quarters of one cycle. The inner periphery of the rotor 14 is in contact with the loop of the wave on the side of the oscillator 13, and the point of contacts completes one excursion along the inner periphery 14a of the rotor 14 for each cycle. The speed of the mass point constituting the loop of the wave is proportional to the amplitude of the oscillation, and is of the order of 0 to several m/sec. The oscillation generated on the side of the oscillator is converted into torque on the side of the rotor with the movement of the contact point for the following reason.

Comparing the circumferential length of the inner periphery 14a of the rotor 14 and that of the corresponding outer periphery 13b of the oscillator 13, the former is greater than the latter as is apparent from FIG. 7. When the contact point alters the rotor 14 is thus shifted with respect to the oscillator 13 by an amount corresponding to the difference between the circumferential lengths of the two. This amount of shift is taken out as rotation.

The direction of rotation can be reversed by inverting the phase of the high frequency voltage applied to the electrodes a and b or c and d.

FIG. 8A is a sectional view showing a different embodiment of the invention, and FIG. 8B is a schematic sectional representation of the same taken along line A—A in FIG. 8A. This embodiment comprises a ring-like elastic oscillator 33 accommodated in a casing 31 and supported by a support. The ring-like elastic oscillator 33 has a tapered inner periphery 33a, which is in contact with a corresponding outer periphery of rotor 34. The rotor 34 is supported for axial movement on a shaft 35. Torque is transmitted from the rotor 34 to the shaft 35 via a pressure adjustment mechanism 36, which has the same construction as that shown in FIG. 5. Designated at 37 is an electrostriction or piezoelectric element, and at 38 bearings. As shown in FIG. 8B, in which the casing 31 is not shown, the electrostriction or piezoelectric element 37 is secured to the outer periphery of the ring-like elastic oscillator 33 which is an elastic body. The element is polarized such that it can undergo elongation and contraction in the directions of arrows, and it is provided with electrodes a to h. The electrodes a to d are connected to a terminal 39, while the electrodes e to h are connected to a terminal 40.

When a high frequency voltage is applied between the terminal 39 and the oscillator 33 while a high frequency voltage 90 degrees out of phase is applied between the terminal 40 and the oscillator 33, the oscillator 33 is caused to undergo bimorph type elastic oscillation. The frequency of this elastic oscillation is given as $$f = \frac{Eh^2}{24(1-\delta^2)\rho a^4} \cdot \frac{n^2(n^2-1)^2}{n^2+1}$$

where E is Young's modulus, $\delta$ is the Poisson ratio, a is the radius of the center circle, h is the peripheral wall thickness, n is the order number of the elastic oscillation, and $\rho$ is the density of the material.

In this embodiment n=2, and FIGS. 9A to 9D show the state of contact between the inner periphery of the rotor oscillator and the outer periphery of the rotor 34 for individual quarters of one cycle. The point of contact between the oscillator and rotor constitutes the loop of the wave. The loop completes one half excursion for each cycle of oscillation. The oscillation generated on the oscillator 33 is transmitted as torque to the rotor 34 with the movement of the contact point as discussed earlier in connection with FIG. 7.

FIG. 10A is a sectional view showing a further embodiment of the invention, and FIG. 10B is a view showing the arrangement of electrodes provided on a piezoelectric member. In this embodiment, high frequency voltages 90 degrees out of phase with each other, which are provided from respective independent circuits, are applied to respective electrode terminals a and b to excite the piezoelectric member 52. An elastic ring 51 supported from stator 54 by supports 56 can undergo bimorph oscillation to produce a surface wave as the resultant of a longitudinal wave and a transverse wave, the surface wave being propagated along the lateral surface 51a of the toroidal elastic ring 51. A rotor 53 which is attached to shaft 55 which is held pressed against this surface 51a receives the driving torque. The electrode arrangement and polarization of the piezoelectric member are shown in FIG. 10B. Here, the pitch of the electrode arrangement is set to one half the wavelength of the surface wave, and the polarization of the piezoelectric member is shown as plus and minus signs (electrode groups a and b being shifted in position by an amount corresponding to a quarter of the wavelength). The individual terminals a and b are connected to terminals a and b of respective distinct circuits. With the above construction, by applying high frequency voltages 90 degrees out of phase from each other to the respective terminals a and b, a progressive wave is formed on the surface of the elastic ring 51.

FIG. 11 shows a further embodiment of the invention applied to a linear motor, in which ultrasonic oscillation is converted to translational motion. As is shown, elastic members 62 are held pressed against the surface of a plate-like member 61. A piezoelectric member 63 is cemented to part of the surface of each elastic member 62. A surface wave (or Rayleigh wave) thus can be produced on the elastic member 62. The elastic member 62 has smoothly curved ends 62a so that the surface wave can be propagated along the surface of the elastic member 62 continuously to cause movement of the plate-like member 61 in the direction of arrow W.

FIG. 12 shows a method of generating a uni-directional surface wave used for the preceding embodiment. A plurality of electrodes 92 are cemented to the surface of a piezoelectric member 91 and are connected through three different circuits to a phase shifter 93. By applying high frequency voltages with respective phases of 0, 120 and 240 degrees to the respective circuits, a uni-directional surface wave can be generated on the piezoelectric member 91.

FIG. 13 shows a modification of the previous embodiment of FIG. 11. Here, a plate-like member 72 is held pressed against the surface of an endless bar-like elastic member 71. A plurality of piezoelectric members 73 are secured to other part of the elastic member 71. With this construction, the endless bar-like elastic member 71 can be caused to undergo elastic oscillation to generate a wave. The wave is propagated and circulated as a progressive wave along the elastic member 71.

FIG. 14A shows a further example of the linear motor. Here, two bar-like elastic members 76 and 77 are secured to each other by couplers 78 and 79. Plate-like members 80 are held pressed against the bar-like elastic member 76. A plurality of piezoelectric members 81 is secured to the other bar-like elastic member 77. With this construction, the piezoelectric members 81 can cause elastic oscillation of the bar-like elastic member 77. The progressive wave thus produced is converted to a longitudinal oscillation of the coupler 78 provided at one end of the elastic member 77. This longitudinal oscillation is converted to elastic oscillation of the bar-like elastic member 76 to be propagated as progressive wave along the bar-like elastic member 76. This progressive wave is transmitted back to the bar-like elastic member 76 through the coupler 79.

FIG. 14B shows a further example of the linear motor. Here, two bar-like elastic members 76 and 77 are secured to each other by resonators 82 and 83. Plate-like members 80 are held pressed against the bar-like elastic member 76. A plurality of piezoelectric members 81 are secured to the other bar-like elastic member 77. With this construction, the piezoelectric members 81 can cause elastic oscillation of the bar-like elastic member 77, and the progressive wave thus produced is converted to a longitudinal oscillation of the resonator 88 provided at one end of the bar-like elastic member 77. The longitudinal oscillation is converted to elastic oscillation of the bar-like elastic member 76 to be propagated as progressive wave along the bar-like elastic member 76. This progressive wave is transmitted back to the bar-like elastic member 77 through the resonator 83.

The coupler and resonator as mentioned above are different in their function as follows:

The coupler serves to convert the elastic oscillation of the bar-like elastic member into longitudinal oscillation or vice versa. Its material and dimensions are restricted by acoustic impedance matching problems. However, its shape is simple so that its size reduction and cost reduction can be readily obtained.

The resonator, while it serves the same role as the coupler, permits comparatively free selection of the acoustic impedance matching and has higher oscillation energy transmission capacity. However, its shape is complicated, and it is necessary to match its characteristic frequency to the oscillation frequency of the oscillation source. For the above reasons, it is rather expensive.

FIG. 15 shows a further example of the linear motor. Here, plate-like members 89 are held pressed against the surface of a bar-like elastic member 86, to which oscillators 87 and 88 are coupled. With this construction, the oscillator 87 can cause elastic oscillation of the bar-like elastic member 86. The oscillator 88 absorbs the oscillation of the progressive wave thus produced and converts it to electric energy to be recovered or fed back to the oscillator 87.

FIG. 16 shows a further embodiment, in which a piezoelectric member 87 is secured to a bar-like (or plate-like) elastic member 96. The piezoelectric member 87 is provided with electrodes which are connected to distinct circuits (A and B). The piezoelectric member is polarized with respect to the elastic member 96 in opposite directions of arrows M and M' perpendicular to the plane of paper for every quarter of the wavelength. By applying high frequency voltages 90 degrees out of phase with each other to the respective electrode groups A and B, the bar-like elastic member 96 is caused to undergo elastic oscillation to produce a uni-directional progressive wave.

Figure 17:
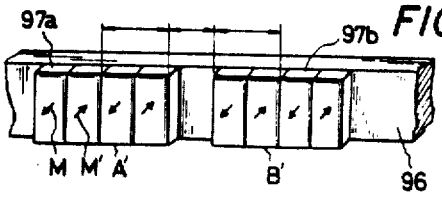
FIGS. 17 and 19 are views showing the modification of the arrangement of FIG. 16.
Figure 19:
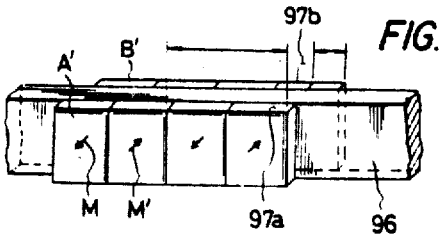

FIGS. 17 and 19 show modifications of the embodiment of FIG. 16. Here, electrode groups A' and B' for respective piezoelectric members 97a and 97b are provided in separate positions. The piezoelectric members 97a and 97b are polarized in opposite directions of arrows M and M' for every quarter of the wavelength. The piezoelectric members 97a and 97b are spaced apart or staggered center-to-center by a distance corresponding to ¼ plus n/2 (n being an integral number) of the wavelength.

Figure 18:
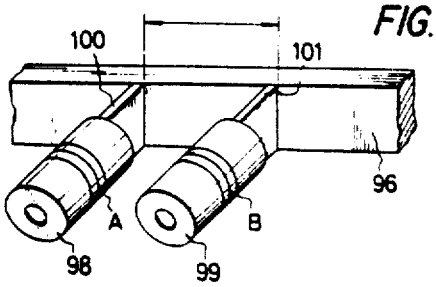
FIG. 18 is a view showing an electrode arrangement for producing a progressive wave on a rod-like elastic member with oscillators.

FIG. 18 shows further modification of the embodiment of FIG. 16. Here, two oscillators 98 and 99 are secured to a bar-like (or plate-like) elastic member 96 via respective couplers 100 and 101. The oscillators 98 and 99 are again spaced apart center-to-center by a distance corresponding to ¼ plus n/2 (n being an integral number) of the wavelength. By applying high frequency voltages 90 degrees out of phase with one another to the respective oscillators 98 and 99, the bar-like elastic member 96 is caused to undergo elastic oscillation to produce a uni-directional progressive wave.

While the above embodiments are concerned with oscillators including or consisting of piezoelectric elements, these elements may be replaced with electrostriction or magnetostriction elements.

As has been described in the foregoing in connection with the operational principles and some preferred embodiments, the motor device according to the invention, unlike the prior art motor devices of various types, utilizes ultrasonic oscillation, i.e., a progressive wave produced on the surface of an elastic body by a piezoelectric, electrostriction or magnetostriction element assembled as oscillator in or on the elastic body. More particularly, the device makes use of a revolutionary system of producing a progressive wave where particle trajectories are elliptical with high oscillation energy of an ultrasonic wave and converting the progressive wave into rotational or translational motion of a moving body. The motor device thus can provide high driving torque even though it is small in size and light in weight, and it can find very extensive applications.

What is claimed is:

1. A motor device utilizing ultrasonic oscillation comprising:

an elastic body;

a piezoelectric [member] , *electrostriction or magnetostriction ultrasonic oscillator* comprising a plurality of piezoelectric, *electrostriction or magnetostriction* elements [in contact with] *secured to* said elastic body;

electrodes formed on said [piezoelectric] elements;

said [piezoelectric] elements being arranged *at least* in first and second groups *having different phases*, each *group* consisting of a plurality of elements the electrodes of which [groups] are connected, respectively, to first and second sources of [alternating current] *high frequency voltage*, the phase of the [alternating current] *voltage* of said second source being [displaced ninety degrees] *out of phase* with respect to the phase of the [alternating current] *voltage* of said first source whereby said [piezoelectric] elements are driven by said [alternating currents] *high frequency voltages* applied to said electrodes to cause oscillation in said elastic body which [produce] *produces* a [Rayleigh] *progressive* wave *constituted by a longitudinal wave and a transverse wave* at a surface of said elastic body;

a movable body having a mating surface in contact with said surface of said elastic body; and means for pressing said mating surface in forced contact with said elastic body surface whereby said [Rayleigh] *progressive* wave acts upon said mating movable body to cause a unidirectional motion of said movable body with respect to said elastic body.

2. A motor device as recited in claim 1 wherein said elastic body is a rod-like member.

3. A motor device as recited in claim 2 wherein said rod-like elastic body is ring-shaped.

4. A motor device as recited in claim 3 wherein said [Rayleigh] *progressive* wave is propagated along a lateral surface of said ring-shaped elastic body and said movable body is a cylindrical rotor member caused to rotate by said [Rayleigh] *progressive* wave.

5. A motor device as recited in claim 4 wherein said cylindrical rotor member is formed with a toroidal shaped rim which is held in contact with said lateral surface of said ring-shaped elastic body.

6. A motor device as recited in claim 5 wherein said lateral surface of said ring-shaped elastic body is planar.

7. A motor device as recited in claim 6 wherein said cylindrical rotor member is provided with a rotatable shaft, said rotor, said ring-shaped elastic body and said [piezoelectric member] *elements* each being disposed coaxially with said shaft.

8. A motor device as recited in claim [5] *3* wherein adjacent elements of each group of said [piezoelectric] elements are set at a pitch corresponding to one half the wave length of said [Rayleigh] *progressive* wave and are reversely polarized with respect to each other.

9. A motor device as recited in claim 8 wherein the [piezoelectric] elements of said second group are shifted in position by an amount corresponding to a quarter of the wave length of said [Rayleigh] *progressive* wave with respect to the position of said first group.

10. The motor device utilizing ultrasonic oscillation according to claim 1 or 3, in which said ultrasonic oscillator is supported by a support and has a central tapered outer periphery held pressed against the inner periphery of said movable body or rotor, and which further comprises a shaft, said movable body or rotor being supported for axial movement on said shaft, and a pressure adjustment mechanism for transmitting torque from said movable body or rotor to said shaft.

11. The motor device utilizing ultrasonic oscillation according to claim 1 or 3, wherein said ultrasonic oscillator includes *a* pair *of* piezoelectric, electrostriction or magnetostriction elements assembled together with an electrode assembly sandwiched therebetween in an intermediate section of said elastic member.

12. The motor device utilizing ultrasonic oscillation according to claim 3, wherein said pressure adjustment mechanism is an automatic pressure adjustment mechanism provided between said shaft and rotor and including a pair of cams having opposed cam surfaces each consisting of a succession of V-shaped portions and steel balls each received in associated V-shaped portions of the pair of cam surfaces.

13. The motor device utilizing ultrasonic oscillation according to claim 3, in which said ultrasonic oscillator includes two or more piezoelectric, electrostriction or magnetostriction elements and has a tapered peripheral portion, and said rotor has a peripheral portion adjacent to an open end held pressed against said tapered peripheral portion of said ultrasonic oscillator, and which further comprises a shaft penetrating a closed end of said rotor and said ultrasonic oscillator, and a pressure adjustment mechanism, said shaft having one end supported in a bearing through said pressure adjustment mechanism.

14. The motor device utilizing ultrasonic oscillation according to claim 3, wherein said piezoelectric, electrostriction or magnetostriction element or elements is or are capable of expansion and contraction in the axial directions.

15. The motor device utilizing ultrasonic oscillation according to claim 3, wherein said ultrasonic oscillator further includes an electrode assembly provided on said [electrostatic] *piezoelectric*, electrostriction or magnetostriction element or elements, said electrode assembly having two or more electrode pairs arranged along a circle and each consisting of diametrically opposed electrodes, the electrodes in each said pair being connected to [each] *an* independent terminal, diametrically opposed portions of said piezoelectric, electrostriction or magnetostriction elements being thereby capable of being expanded and contracted respectively or vice versa.

16. The motor device utilizing ultrasonic oscillation according to claim 3, wherein a central portion of said ultrasonic oscillator is held in contact with a corresponding inner peripheral portion of said rotor.

17. The motor device utilizing ultrasonic oscillation according to claim 1 or 2, in which said ultrasonic oscillator is a ring-like oscillator supported by a support and having a tapered inner periphery the outer periphery of said ring-like oscillator being constituted by a piezoelectric, electrostriction or magnetostriction element, and said movable body is a cylindrical rotor having an outer periphery held pressed against said tapered inner periphery of said ring-like oscillator, and which further comprises a shaft, said rotor being supported for axial movement on said shaft, and a pressure adjustment mechanism for transmitting torque from said rotor to said shaft.

18. The motor device according to claim 17, wherein the outer periphery of said ring-like oscillator is constituted by a circumferentially polarized piezoelectric, electrostriction or magnetostriction element.

19. The motor device utilizing ultrasonic oscillation [accoring] *according* to claim 17, wherein said pressure adjustment mechanism is provided between said shaft and said rotor and has a cam and plurality of steel balls.

20. The motor device utilizing ultrasonic oscillation according to claim 1, wherein said movable body is a plate-like member movable in a fixed direction, and said ultrasonic oscillator includes one or more elastic members held pressed against said plate-like member and one or more piezoelectric, electrostriction or magnetostriction elements secured to said elastic member or members [and connected to two or more distinct circuits], high frequency voltages having different phases being applied to [said] respective [distinct circuits] *elements* to utilize a progressive wave produced on the surface of said elastic member or members and constituted by a longitudinal wave and a transverse wave for causing translational motion of said plate-like member in said fixed direction.

21. The motor device utilizing ultrasonic oscillation according to claim 1, wherein said ultrasonic oscillator includes a bar-like elastic member and one or more piezoelectric, electrostriction or magnetostriction elements secured to said bar-like elastic member [and connected to two or more distinct circuits], and said movable member is a plate-like member held pressed against another portion of said bar-like elastic member than the portion to which said piezoelectric, electrostriction or magnetostriction element or elements is or are secured, high frequency voltages of different phases being applied to [said] respective [distinct circuits] *elements* to generate a progressive wave constituted by a longitudinal wave and a transverse wave on the surface of said bar-like elastic member, said progressive wave being converted to a uni-directional motion of said plate-like member.

22. The motor device utilizing ultrasonic oscillation according to claim 21, wherein said bar-like elastic member is endless.

23. The motor device utilizing ultrasonic oscillation according to claim 1 or 2, wherein said ultrasonic oscillator includes two bar-like elastic members secured to each other by coupler means and a plurality of piezoelectic, electrostriction or magnetostriction elements secured to one of said bar-like elastic members, and said movable body is a plate-like member held pressed against the other one of said bar-like elastic members, a progressive wave generated on the surface of said bar-like elastic members and constituted by a longitudinal wave and a transverse wave being converted to a uni-directional motion of said plate-like member.

24. The motor device utilizing ultrasonic oscillation according to claim 1 or 2, wherein said ultrasonic oscillator includes two bar-like elastic members secured to each other by resonator means and a plurality of piezoelectric, electrostriction or magnetostriction elements secured to one of said bar-like *elastic* members, and said [mavable] *movable* body is a plate-like member held pressed against the other one of said bar-like elastic [member] *members*, a progressive wave generated on the surface of said bar-like elastic member and constituted by a longitudinal wave and a transverse wave being converted to uni-directional motion of said plate-like member.

25. The motor device utilizing ultrasonic oscillation according to claim 1 or 2, wherein said movable body is a plate-like member, and said ultrasonic oscillator includes a bar-like elastic member, said plate-like member and said one or more piezoelectric, electrostriction or magnetostriction elements being arranged on said bar-like elastic member.

26. The motor device utilizing ultrasonic oscillation according to claim 21, wherein said ultrasonic oscillator includes a plurality of piezoelectric, electrostriction or magnetostriction elements secured to one surface of said bar-like elastic member and polarized in a distinct manner for every quarter of the wavelength of a progressive wave generated on the surface of said bar-like elastic member with elastic oscillation thereof.

27. The motor device utilizing [elastic] *ultrasonic* oscillation according to claim 21, wherein said ultrasonic oscillator includes a plurality of piezoelectric, electrostriction or magnetostriction elements secured to one surface of said bar-like elastic member and polarized in a distinct manner for every one half of the wavelength of a progressive wave generated on the surface of said bar-like elastic member with elastic oscillation thereof, said piezoelectric, electrostriction or magnetostriction elements being arranged with a center-to-center interval corresponding to ¼ plus n/2 of the wavelength.

28. The motor device utilizing ultrasonic oscillation according to claim 21, wherein said ultrasonic oscillator includes a plurality of piezoelectric, electrostriction or [magnetrostriction] *magnetostriction* elements secured to one surface of said bar-like elastic member through respective couplers and arranged with a center-to-center interval corresponding to ¼ plus n/2 of the wavelength of a [progrressive] *progressive* wave generated on the surface of said bar-like member with elastic oscillation thereof.

29. The motor device utilizing ultrasonic oscillation according to claim 1, wherein said ultrasonic oscillator includes an endless elastic member and a plurality of piezoelectric, electrostriction of magnetostriction elements secured to the surface of said endless elastic member, a progressive wave produced on said endless elastic member with elastic oscillation thereof and constituted by a longitudinal wave and a transverse wave being converted into a uni-directional motion of said movable body.

* * * * *